(12) United States Patent
Blanchard

(10) Patent No.: US 10,017,094 B2
(45) Date of Patent: Jul. 10, 2018

(54) TROLLEY WITH ARTICULATED ARM

(71) Applicant: HOOK UP SOLUTIONS LLP, Hertfordshire (GB)

(72) Inventor: Tim Blanchard, Hertfordshire (GB)

(73) Assignee: HOOK-UP SOLUTIONS LIMITED, Baldock Herts (GB)

( * ) Notice: Subject to any disclaimer, the term of this patent is extended or adjusted under 35 U.S.C. 154(b) by 96 days.

(21) Appl. No.: 15/026,707

(22) PCT Filed: Oct. 2, 2014

(86) PCT No.: PCT/GB2014/052987
§ 371 (c)(1),
(2) Date: Apr. 1, 2016

(87) PCT Pub. No.: WO2015/049530
PCT Pub. Date: Apr. 9, 2015

(65) Prior Publication Data
US 2016/0250959 A1    Sep. 1, 2016

(30) Foreign Application Priority Data

Oct. 2, 2013  (GB) .................................. 1317471.9
Oct. 11, 2013 (GB) .................................. 1318052.6
Sep. 2, 2014  (GB) .................................. 1415535.2

(51) Int. Cl.
*B60P 1/54*    (2006.01)
*B66C 23/46*   (2006.01)
(Continued)

(52) U.S. Cl.
CPC ........... *B60P 1/5423* (2013.01); *B60P 1/5428* (2013.01); *B60P 1/5433* (2013.01); *B60P 7/14* (2013.01);
(Continued)

(58) Field of Classification Search
CPC ..... B60P 1/5404; B60P 1/5423; B60P 1/5428; B60P 1/5433; B60P 7/14; B60P 7/15;
(Continued)

(56) References Cited

U.S. PATENT DOCUMENTS 2,528,588 A * 11/1950 Forslund ............... B60P 1/5433
                                                 212/204
3,187,905 A *  6/1965 Moskopf et al. ...... B60P 1/5428
                                                 212/349
(Continued)

FOREIGN PATENT DOCUMENTS

DE    2743373 A1 *  3/1978  ............ B60P 1/5433
DE    3241387 A1 *  5/1983  ............ B60P 1/5433
(Continued)

OTHER PUBLICATIONS

International Search Report for PCT/GB2014/052987 dated Dec. 4, 2014.

*Primary Examiner* — James Keenan
(74) *Attorney, Agent, or Firm* — Kevin P. Radigan, Esq.; Heslin Rothenberg Farley & Mesiti P.C.

(57) ABSTRACT

A self-propelled flat-bed trolley is provided which includes a motor for locomotion and including a load-bearing platform and an articulated crane with a telescopic arm adapted to load and unload articles to and from the platform. The crane is maneuverable to locate the center-of-mass of the articles within a base of support for the trolley, with the trolley further including a controller for controlling the motor and articulated crane.

17 Claims, 25 Drawing Sheets

(51) Int. Cl.
*B66F 9/065* (2006.01)
*B60P 7/14* (2006.01)
*B66C 23/78* (2006.01)

(52) U.S. Cl.
CPC .............. *B66C 23/46* (2013.01); *B66C 23/78* (2013.01); *B66F 9/065* (2013.01); *B66F 9/0655* (2013.01)

(58) Field of Classification Search
CPC ...... B60S 9/00; B60S 9/02; B60S 9/10; B66C 23/46; B66C 23/78; B66F 9/0655; B66F 9/07559
See application file for complete search history.

(56) References Cited

U.S. PATENT DOCUMENTS

| | | | | |
|---|---|---|---|---|
| 3,407,947 A | * | 10/1968 | Valla | B66F 9/0655 212/264 |
| 3,754,516 A | * | 8/1973 | Van Gompel | B60P 7/14 410/128 |
| 4,052,083 A | * | 10/1977 | Lutz | B60P 7/14 410/122 |
| 4,091,943 A | * | 5/1978 | Bay-Schmith | B60P 1/5433 414/555 |
| 4,772,165 A | * | 9/1988 | Bartkus | B60P 7/15 211/7 |
| 4,881,865 A | * | 11/1989 | Herolf | B60P 1/5433 414/550 |
| 5,106,255 A | * | 4/1992 | Motoda | B60P 1/5433 212/238 |
| 5,427,487 A | * | 6/1995 | Brosfske | B60P 7/15 410/121 |
| 5,433,566 A | * | 7/1995 | Bradley | B60P 7/15 224/323 |
| 6,688,836 B2 | * | 2/2004 | Gourand | B60P 1/5433 414/541 |
| 7,172,083 B1 | * | 2/2007 | Raines | B60P 1/5423 212/261 |

FOREIGN PATENT DOCUMENTS

| | | | | |
|---|---|---|---|---|
| DE | 3340437 A1 | | 5/1985 | |
| FR | 2144153 A5 | * | 2/1973 | ............ B60P 1/5433 |
| FR | 2517607 A1 | | 6/1983 | |
| GB | 1318199 A | * | 5/1973 | ............ B60P 1/5433 |
| SU | 709038 A | * | 1/1980 | |

* cited by examiner

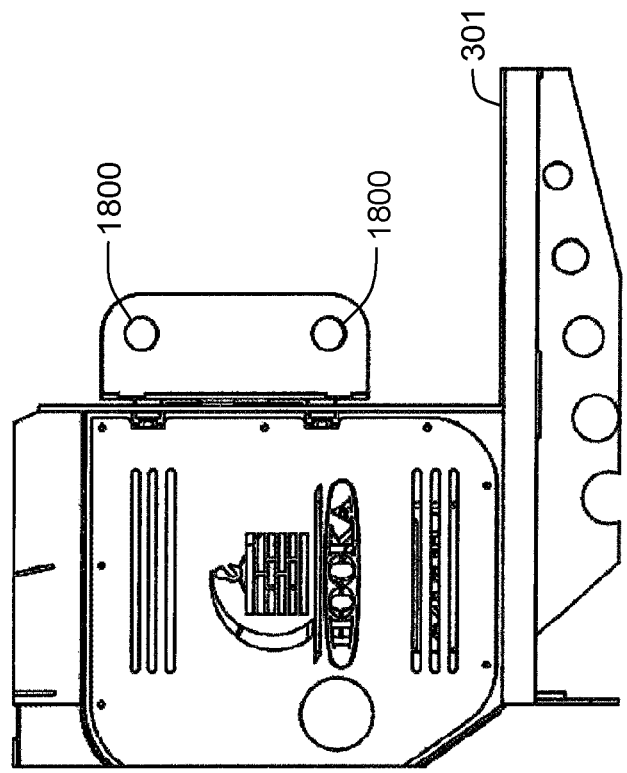

TROLLEY WITH ARTICULATED ARM

This application is a § 371 U.S. National Stage application, claiming priority from International Patent Cooperation Treaty (PCT) application Serial No. PCT/GB2014/052987, filed Oct. 2, 2014, entitled "Trolley with Articulated Arm", which published on Apr. 9, 2015, as PCT Publication No. WO 2015/049530. PCT Application No. PCT/GB2014/052987 claims priority from GB Application No. 1317471.9, filed Oct. 2, 2013, from GB Application No. 1318052.5, filed Oct. 11, 2013, and from GB Application No. 1415535.2, filed Sep. 2, 2014. Each of these applications is hereby incorporated herein in its entirety.

The field of the invention relates to devices for load transportation and more particularly the short range transportation of bulk building materials.

Due to the constraints of planning laws and issues of space in gardens etc., the majority of building work for medium sized projects, such as home extensions, takes place at the back of properties. This can create an access problem as many properties do not have road access to the rear and access around the side of residential homes via for example side gates, may be very narrow. Bulk building materials, such as sand and ballast etc., are typically delivered in 1 tonne bags, or palleted materials such as bricks/blocks etc. up to approximately 1½ tonnes. The bags/pallets are often delivered by truck, such as a 17.5 tonne truck with a "HIAB" TM crane which allows the unloading of materials from the truck onto a drive or pavement, up to 4 meters from the truck. Vehicles of this type are typically used to transport building materials to a building site, and may also incorporate a telescopic crane.

Such vehicles are satisfactory for delivery of building materials generally or for work carried out at the front of a building or where road access is available. However, for projects at the rear of a building or other locations where there is no road access, or where materials must be transferred along narrow paths, a builder would find transferring bulk materials to the project site and also of removing waste materials problematic. This can be extremely labour/time/money intensive, resulting in considerable increases in the cost and completion time of building projects.

To address this problem, one might consider using a reduced-scale truck and crane (of the type already known in the industry in full-scale) to allow access to the back of a building where the work is to be carried out. However, such a reduced scale vehicle would have a number of disadvantages: it would be comparatively heavy, wasting energy and also reducing the total amount of deliverable load, and also it would not be able to carry the sorts of loads contemplated, as doing so would incur the risk of the reduced scale vehicle toppling over during transit or unloading.

Furthermore, it is known in the prior art that in order to move a 1 tonne load, at least a 3½ tonne machine is required in order to safely suspend the load without tipping the vehicle.

The present invention is directed to solving at least some of the problems set out above.

Accordingly, in its broadest aspect, the present invention provides a self-propelled flat-bed trolley, comprising motorized locomotion means, a load-bearing platform, an articulated crane having a telescopic arm adapted to load and unload articles to and from said platform, and a control means for said motorized locomotion means and articulated crane means. The trolley is able to load and unload materials to it's flat-bed and transport them through narrow passages where traditional means of material transport would not be able to travel In a preferred embodiment, the crane is maneuverable to locate a centre-of-mass of said articles within a base of support for said trolley. Therefore the articulated crane can reach and load/unload articles from outside its base by rotation and/or extension, and maneuver them to the flat-bed of the trolley, inside the base of support.

Preferably, the trolley comprises at least one further arm hingeably attached to said trolley and moveable between a first and a second position acting as a stabilizing outrigger for said trolley, and a second position whereby the arm secures any articles loaded atop the platform. This provides the trolley with stability whilst transporting the load, since the arms in their second position restrain the load, preventing it from sliding/moving about the flat-bed.

Preferably still, the further arm is curved. This allows the arm to reach the ground and engage any load with a smaller arc of movement about its pivot.

Preferably still the further arm comprises two sections, a first section, proximal to the hinge, which curves substantially upwards in a "u" shape, and a second section, distal from the hinge, which curves substantially downwards in an "n" shape. The curved arm operates in its first position as normal, however, the "kink" in the arm is able to engage a load sooner in its second position, thus enabling the device to secure smaller loads without having to rotate the stabilizing arms back any further.

Preferably, propelled flat-bed trolley according to claim 5, further comprising a lock-plate removably attached to the further arm, and adapted to engage with and restrain any articles atop the platform when the further arm is in the second position.

Preferably, the stabilizing arm comprises a plurality of receiving points on the further arm providing multiple attachment points for the lock-plate, therefore allowing for different shaped and sized loads.

Preferably, the lock-plate is tiltably engaged with the further arm, so that the tiltable head of the lock-plate can engage with the load better no matter the angle it engages with it at.

Preferably, the lock-plate comprises a head section for engaging with a load, and a stem section extending away from the head for attaching the lock-plate to the further arm of the trolley, wherein the stem section comprises a plurality of attachment points along its length so that the distance of the head section from the further arm of the trolley may be adjusted according to the size of a load to be secured. This allows the lock-plate to secure smaller loads by extending the reach of the lock-plate from the stabilizing arms of the trolley.

Preferably, the trolley further comprises a barrier surface substantially perpendicular to said load bearing platform providing a restraint in at least one direction for any articles loaded atop said platform. This provides a surface against which the load may be braced and secured during transport.

Preferably, the trolley also comprises opposing side-panels on either side of, and substantially perpendicular, to the barrier surface. These provide side supports to retain and support any load, to prevent sideways movement.

Preferably the distance between the opposing side-panels is hydraulically controlled for ease of adjustment. The panels may also be used to re-locate the load on the trolley flat-bed.

Preferably, each panel includes at least one rounded corner, so as not to damage any load that may come into contact with them. Preferably still, the side-panels are padded to avoid damaging any load secured by them.

Preferably, the articulated crane comprises a mast supporting said telescopic arm, and a hydraulic support ram engaging said arm and the mast. Preferably still, the mast comprises a first support member and a second support member defining a cavity for receiving said hydraulic support ram. This frees space on the flat-bed trolley for the load.

Preferably, the telescopic arm further comprises a first arm section engaged with the mast, and a telescopic second arm section, hydraulically moveable with respect to the first arm section between a first position and a second position. Preferably, the telescopic second section is slidably movable through said mast between said first and second positions. Preferably still, the first position is a first operable position on a side of the mast adjacent the load bearing platform and said second position is a second operable position on an opposite side of the mast to the load bearing platform.

Preferably, the telescopic arm further comprises a further arm section moveable with respect to the rest of the telescopic arm, and said second arm and comprising at least one slidably movable load-retaining plate. This provides further restraint to any load located upon the platform. Preferably still, the load retaining plate is hydraulically controlled.

In a preferred embodiment, the locomotion means are caterpillar tracks for easily traversing the rough ground of a building site.

Preferably, the telescopic arm of the crane is curved. This allows the crane to both reach and lower in one motion, requiring less input from the operator.

Preferably, the telescopic arm can be lowered towards the platform to engage with and secure any articles loaded atop the platform.

Preferably, the articulated crane is adaptable to extend beyond the front of the trolley platform so as to be able to load, and unload, articles from directly in front of the trolley. This removes the need for the crane to be able to rotate, and allows it to operate fully in a narrow environment.

Preferably the operator controls and operates the locomotion and orientation of the trolley and crane from the ground.

The above and other aspects of the invention will now be described by way of example only, with reference to the following drawings in which.

FIGS. 18(*a*) & 18(*b*) are side-on and front-on views, respectively, of the adjustable side-panel features of the present invention.

FIGS. 19(*a*)-19(*c*) respectively comprise a side-on, top-down and perspective view of one embodiment of the pivotable stabilizing legs.

FIGS. 20(*a*)-20 (*c*) comprise side-on, top-down and perspective views, respectively, of one preferred embodiment of the invention in its loading configuration.

The present invention discloses a tracked vehicle with an articulated crane mechanism for transporting a load, such as for example building materials, in a confined area.

Figure 1:
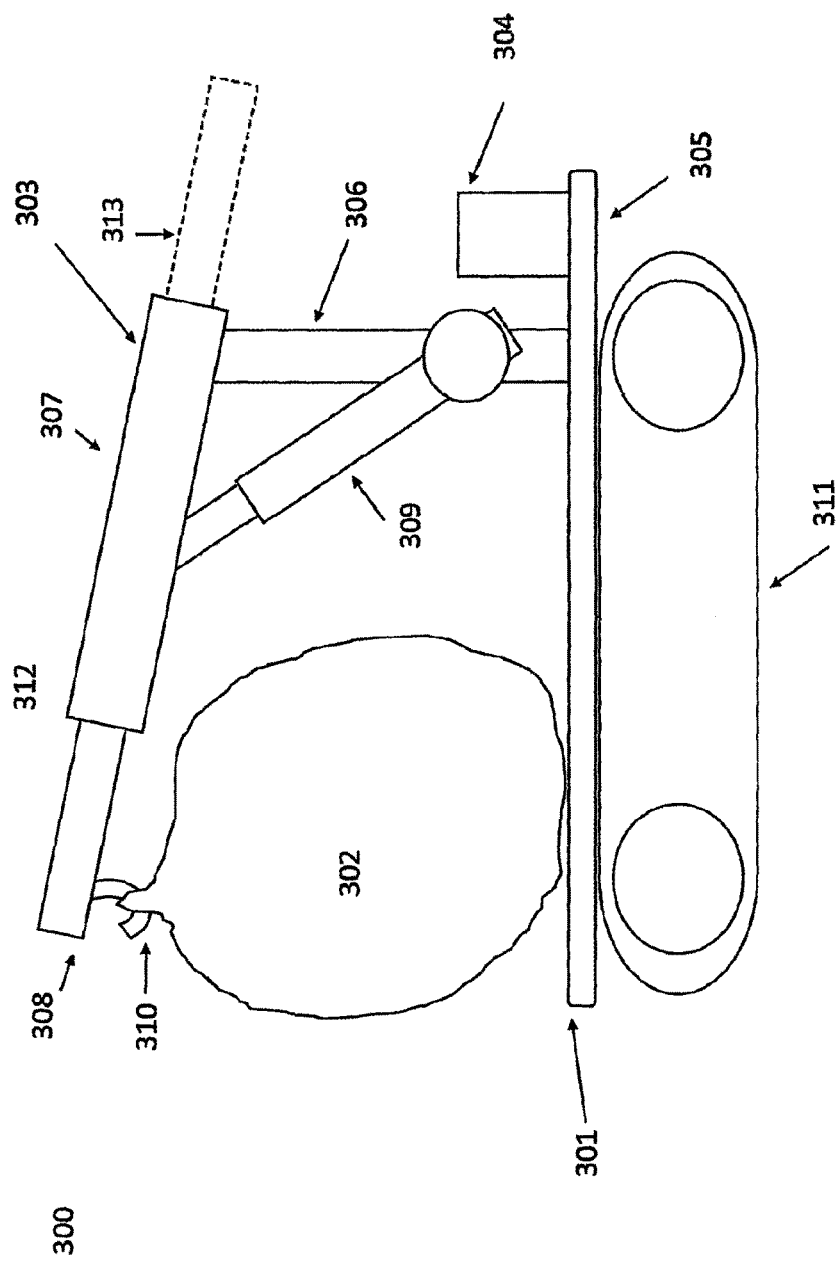
FIG. 1 is a side view of a trolley with a load, according to an embodiment of the invention.

A first embodiment of the invention is shown in FIG. 1. This embodiment provides a self-propelled trolley 300, comprising a flat-bed platform 301 for the transportation of a load 302 and a telescopic crane 303 for loading and unloading the load 302. In a preferred embodiment, caterpillar tracks 311 are provided to improve the stability of the device when traversing uneven terrain. The person skilled in the art will appreciate that a wheeled trolley without tracks also serves this purpose and falls within the scope of the invention.

The load 302 illustrated in FIG. 1 is contemplated to be a 1 tonne bag, typical of the type used for the delivery of bulk building materials to small and medium sized building sites. The invention is also suitable for other types of load and the invention is not limited to the transportation of any one type of load.

To provide a driving force for the trolley a propulsion device 304 is provided. This is typically a petrol or diesel engine, or a battery driven motor. The invention is not limited to any one method of propulsion. In a preferred embodiment of the invention, the propulsion device 304 is situated on a platform overhang section 305. This assists in stabilising the trolley 300 by counterbalancing any load place upon it.

However, the propulsion device 304 is sufficiently close to the tracks or wheels not to unbalance the trolley when unloaded. The person skilled in the art will appreciate that other arrangements can provide a similar stability and the invention is not limited to including this feature. For example, the propulsion unit 304 may be located entirely within the base of support of the trolley, i.e. within the base of the wheels or caterpillar tracks.

The telescopic crane 303 comprises a mast 306, a boom 312 which itself comprises a first section 307 and a second extension section 308, a support ram 309 and a hook 310.

In one embodiment, the first section 307 can move longitudinally, along its long axis, in relation to mast 306 to a position 313 wherein a portion of the first section 307 is located substantially behind the mast. This action provides for additional stability in transit, both by allowing the load to be pulled as far as possible toward the mast 306, and by transferring weight beyond the mast to the opposite side as the load 302, providing a counter-balancing effect.

In a further embodiment, the hook 310 may be replaced with a number of other attachment modules. For instance, the trolley may also be equipped with a "rotator" module engaged with the articulated crane, which is able to rotate a load suspended beneath it. This is useful for correct placement of the load upon the trolley platform.

The trolley, at typically less than 900 mm wide and lighter than the typical weight of the load it carries, is adapted to fit within a pedestrian side alley of a house, and will lift, load, secure, transport, and then unload a full 1 tonne bag of bulk materials into a building site. It can then also be used to remove any waste material from the site using the same 1 tonne bags. This obviously has massive cost and convenience benefits for builders and allows companies to offer an enhanced service by delivering bags, not just to the roadside, but right into the 'heart' of the build job. In addition to an embodiment with a width of substantially 900 mm, another embodiment of the invention has a width of 750 mm. The person skilled in the art will appreciate that other widths are possible and the invention is not limited to any particular width and that the invention may easily be adapted to suit the paths and terrain on which it is to be used.

Figure 2:
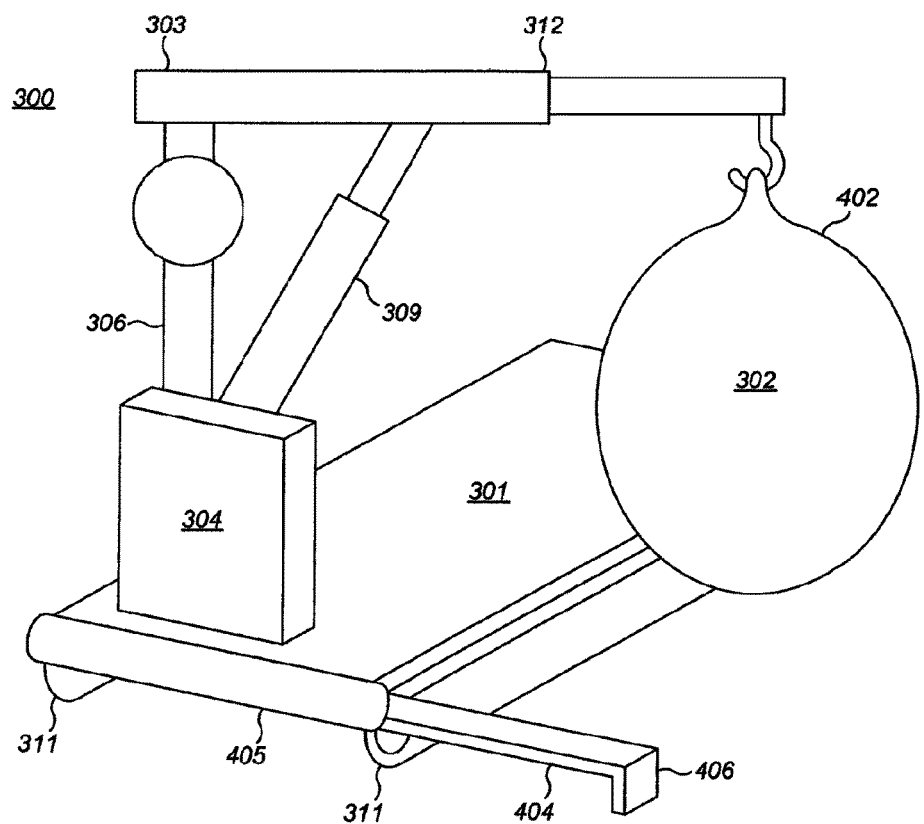
FIG. 2 is a perspective view of a trolley according to an embodiment of the invention in a loading and unloading configuration.

FIG. 2 is a perspective view of the trolley 300 in a loading and unloading configuration. The articulated crane 303 has been rotated from its transit position directed, substantially parallel to the direction of motion of the caterpillar tracks, to a direction substantially transverse to the tracks. Retractable support struts 404, which may generally be stored within the body of the trolley 300 in tubes or channels 405, are shown in an extended position engaged with support jacks 406. These struts provide a wider base of support for the trolley in order to be able to suspend the weight of a load 302.

Figure 3:
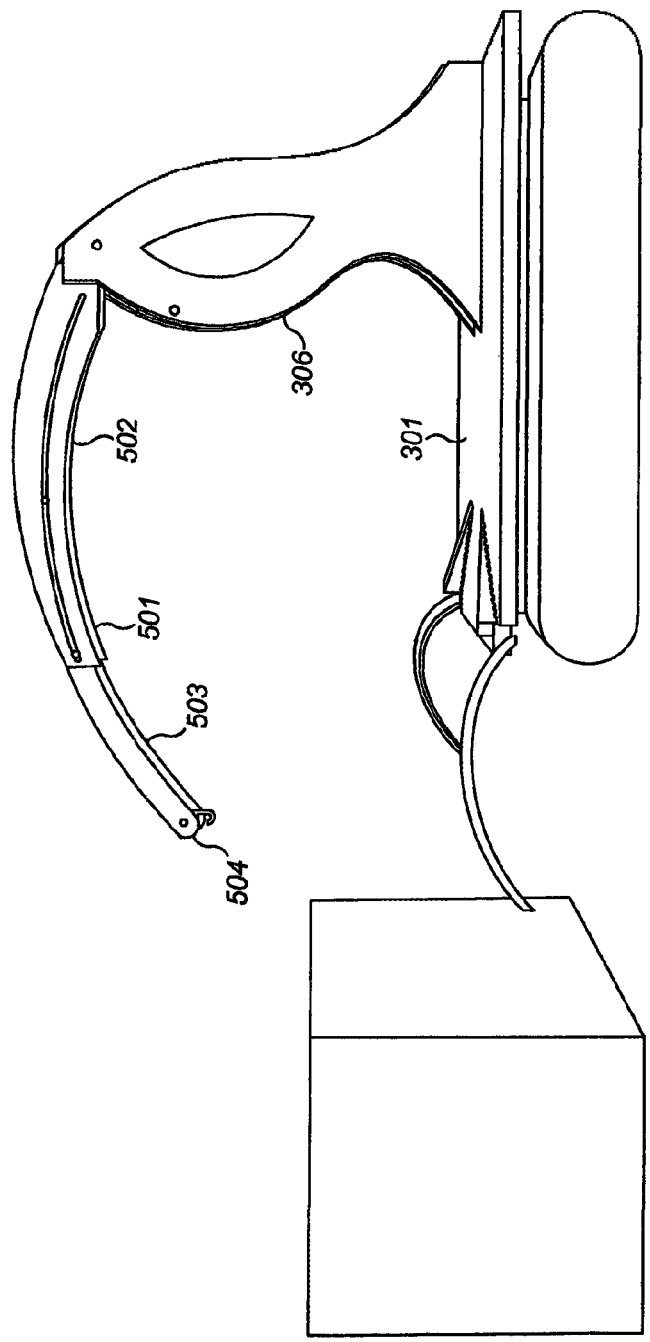
FIG. 3 is a side view of an embodiment of the invention with a curved telescopic arm in an extended configuration.
Figure 4:
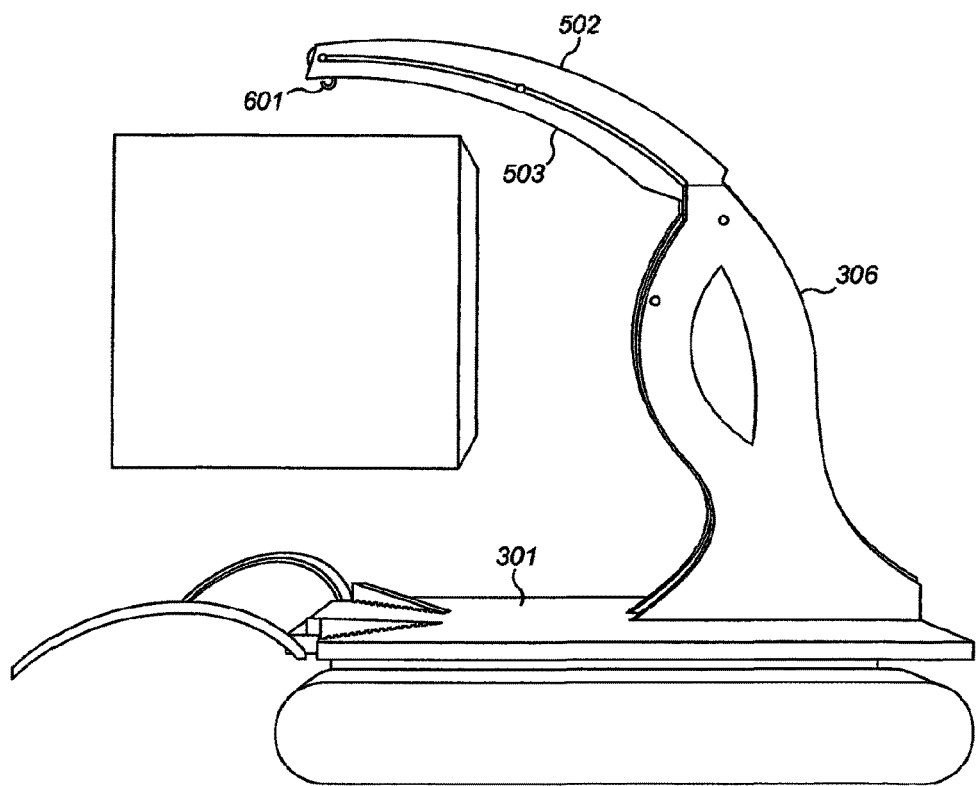
FIG. 4 is a side view of the embodiment of FIG. 3 in its retracted configuration.

FIG. 3 shows another embodiment of the invention, wherein the crane 300 comprises a curved telescopic arm 501. The curved telescopic arm 501 comprises a first section 502 and a second extension section 503. FIG. 3 shows the extension section 503 in its extended configuration 504 while FIG. 4 is a side view of the embodiment of FIG. 3 with the extension section 503 in its retracted configuration 601. The curved shape of both the fixed and extension sections of the telescopic arm enables a more compact motion of the telescopic arm 501 when it "booms out", i.e. the curved boom extends and dips/lowers the distal end of the crane in a single motion. Less travel is required on the hydraulic arm which controls the boom, which reduces operator input, reduces room for error and increases safety. The arrangement also allows the boom action to be achieved with a single hydraulic ram, with consequent benefits of reduced complexity and critically reduced weight.

Figure 5:
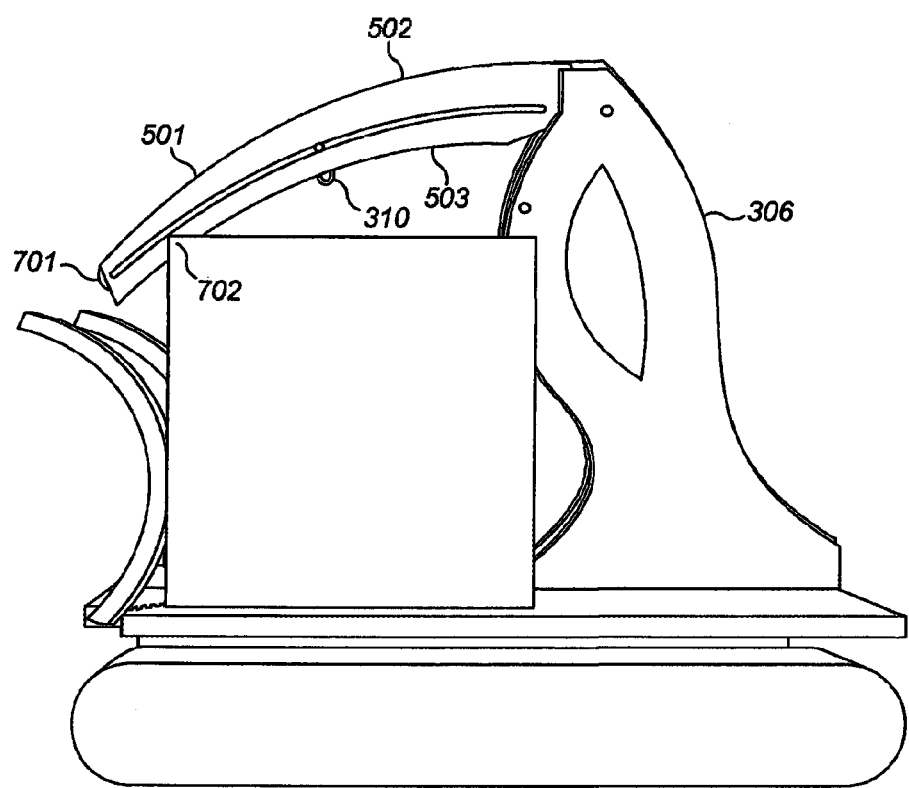
FIG. 5 is a side view of another embodiment of the invention.

FIG. 5 is a side view of a further embodiment, in which the second extension section 503 of the telescopic arm 501 is completely retracted within the first section 502 such that hook 310, positioned at an end of the second extension section 503, is located substantially in the centre of first section 502. This advantageously enables the positioning of the load close to the mast 306. It also enables the crane end 701 distal to the mast 306 to be lowered onto any load positioned on platform 301 to provide a restraint to the movement of the load whilst it is in transit. The curvature of the telescopic arm also contributes to this restraint by improving contact between the telescopic arm and the load at point 702.

Thus any load 302 may be lifted from either side of the trolley, or an end of the trolley, onto the flat bed platform, and held there by action of the arm 501, which reduces the propensity of the load to move during transit.

Figure 6:
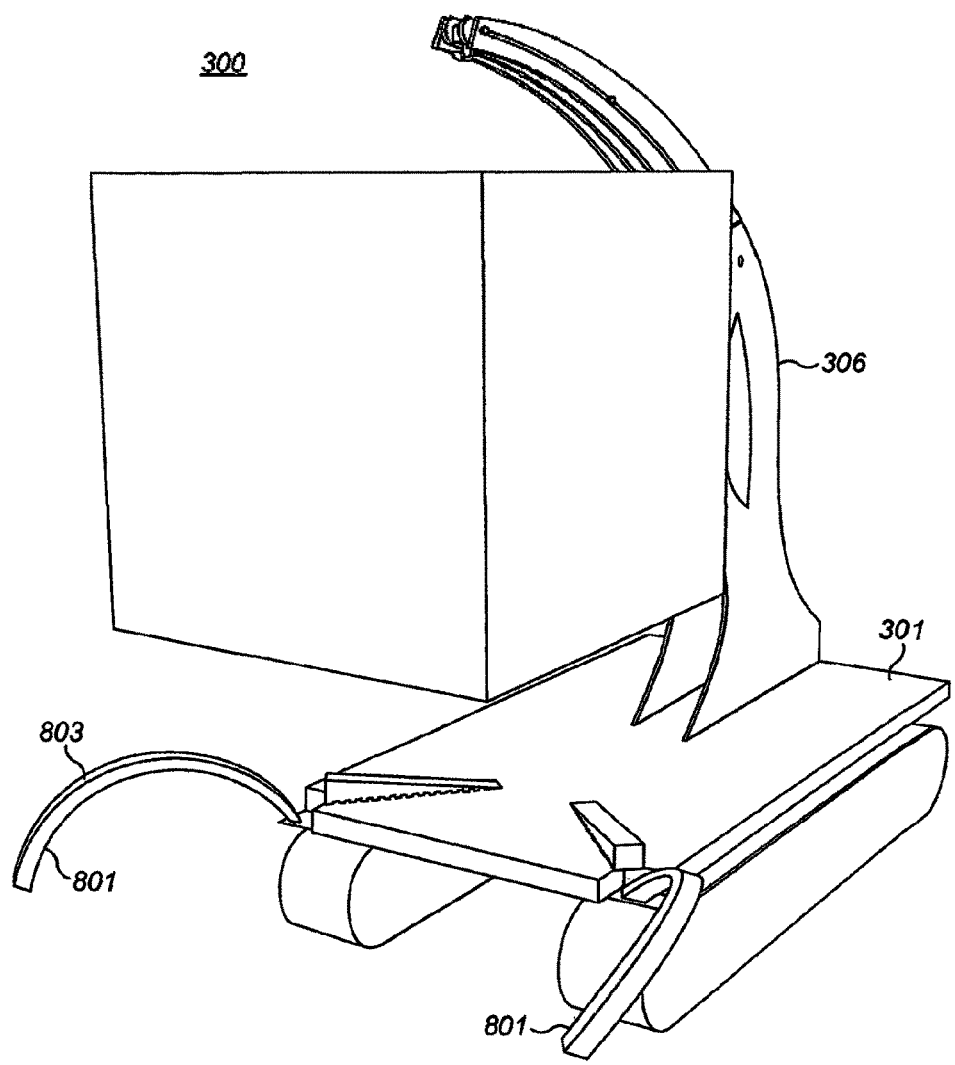
FIG. 6 is a perspective view of a trolley and pivoted sections according to an embodiment of the invention

In another aspect of the invention, there is provided a further solution to the problem of load movement, which can be used on its own or in combination with the curved telescopic arm. FIG. 6 shows a pivoted arm section 801 provided on the platform 301, that acts both as a stabilizer and out-rigger, when the trolley is stationary and the load is being loaded and unloaded, and as a load restraint when the trolley is loaded and in motion. In particular, FIG. 6 is a perspective view of a trolley in accordance with the present invention with such a pivoted arm section 801 showing that the pivoted section 801 is pivotally connected to the platform 301 of the trolley 300. In FIG. 6, the pivoted sections 801 are shown in an outwardly extended stabilizer position 802, in which position they act as stabilizers.

In a preferred embodiment there is a provided a double curvature (a compound curve) in the pivoted section 801. A first curvature 803 is laterally outwards from the trolley 300 when the pivoted sections are in their stabilizer position 802. This curvature enables the pivoted section 801 to extend to a width wider than platform 301 of trolley 300, thus allowing the device to extend its stabilizer arms around a load located in front, that is the same width or slightly wider than the trolley platform 301, before it is loaded onto the platform 301. A second curvature of the pivoted section 801 is directed downwardly and allows contact between pivoted sections and the ground. In this embodiment, in its extended position, whilst the first curvature 803 is initially laterally outwards from the trolley 300, the curved stabilizer arms 301 curves back inwards, and do not extend substantially wider than the width of the trolley 300, therefore the trolley may still be operated within a restricted width environment. The skilled person will recognize that the stabilizing arms are not limited to a particular curved shape, and may indeed be any suitable shape, including straight out-riggers pivotally engaged with the trolley.

In a preferred embodiment, the hinges that act between the trolley platform 301 and the pivotal stabilizer arms 301 are located along the front edged of the platform 301, or substantially thereabouts. The hinges may operate in a back and forth direction substantially aligned with the direction of the platform 301. Alternatively, the hinges may be angled so that the pivotal stabilizer arms 801 pivot at an angle to the forward direction of trolley 300, extending outwards from the platform 301, and retreating upwards and inwards towards the platform 301, and any load located on it. In a preferred embodiment, the pivotal stabilizer arms are orientated to pivot at approximately 45° to the forward direction of the trolley. When combined with the curved stabilizer arms as described above, the 45° angle of pivot allows the stabilizer arms to extend beyond the width of the load in front of the trolley during loading and unloading (allowing the load to sit between them on the ground), but retreat to a position within the width of the trolley, thus securing the load on the trolley platform for transport.

Figure 7:
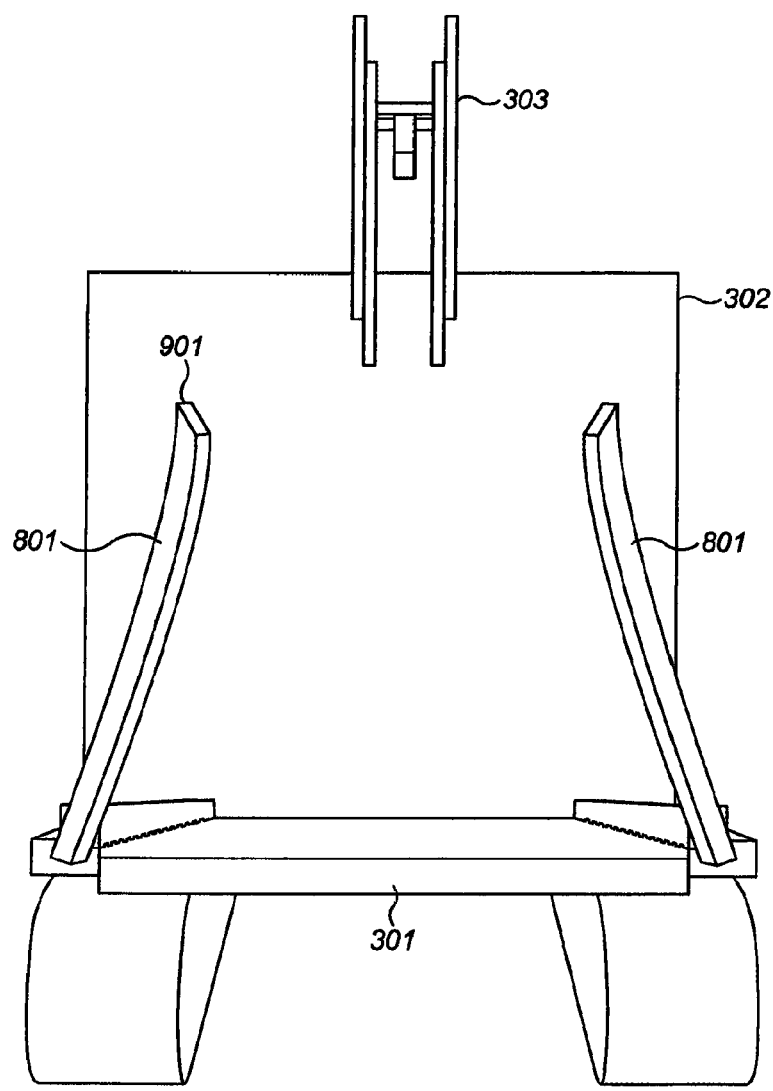
FIG. 7 is a front view of the embodiment of FIG. 6, with stabilising arm sections in a restraining configuration.

Once a load is positioned on the flat bed platform 301, pivoted sections 801 may be moved from a ground engaging position to a position in which they engage with the load on the trolley, urging it to remain in position on the trolley. FIG. 7 is a front view of the embodiment of FIG. 6, with the pivoted sections 801 in the restraining configuration 901 as stated. In this configuration, the pivoted sections 801 act to hold the load 302 onto the platform 301. With the pivoted sections 801 in their restraining position 901 acting as a restraint on the load 302, any excessive movement in and of the load is prevented whilst transportation of the load 302 is taking place. The prevention of this movement is of critical importance to prevent the upturning of the light weight trolley 300.

Figure 8:
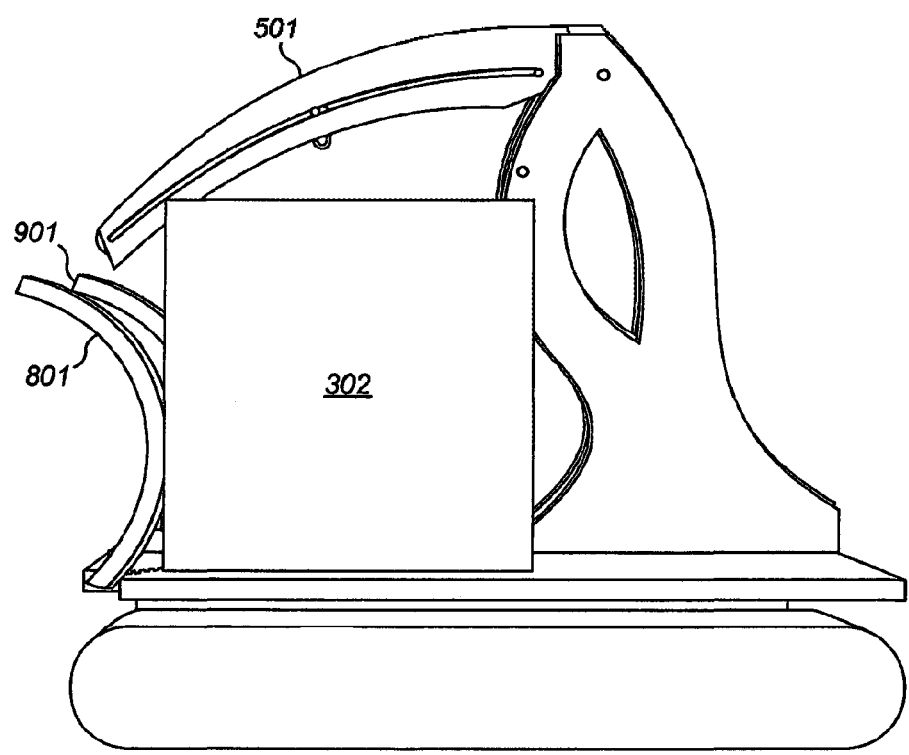
FIG. 8 is a side view of the embodiment of FIG. 7, with stabilising arm sections in the restraining configuration.

FIG. 8 is a side view of the embodiment of FIG. 6 with the pivoted sections 801 in their first restraining position 901. FIG. 8 illustrates the cooperation between the curved telescopic arm 501 in its lowered position, and the pivoted sections 901 to restrain load 302.

The securing in position of the load 302 makes a significant contribution to the overall stability of the trolley. It is well known in the industry that loads can very easily destabilize cranes, even on a much heavier vehicle. It is known for a one tonne bag to cause the overturn of a 12 tonne crane once it starts to move around. Even a relatively small shift of the load can be enough to overturn a vehicle, since only a small velocity of a mobile and large load will provide it with large momentum. This inherent instability of loads would lead the skilled person not to consider the use of a very light vehicle for the purpose of transport of building materials, especially one which is lighter than its typical load. However, the conventional view that a reduced size craned vehicle would be too unstable for the purpose herein described is found to not take into account the effect of the load which, when properly fixed, acts effectively as part of the vehicle, resulting in a far greater than expected stability.

Figure 9:
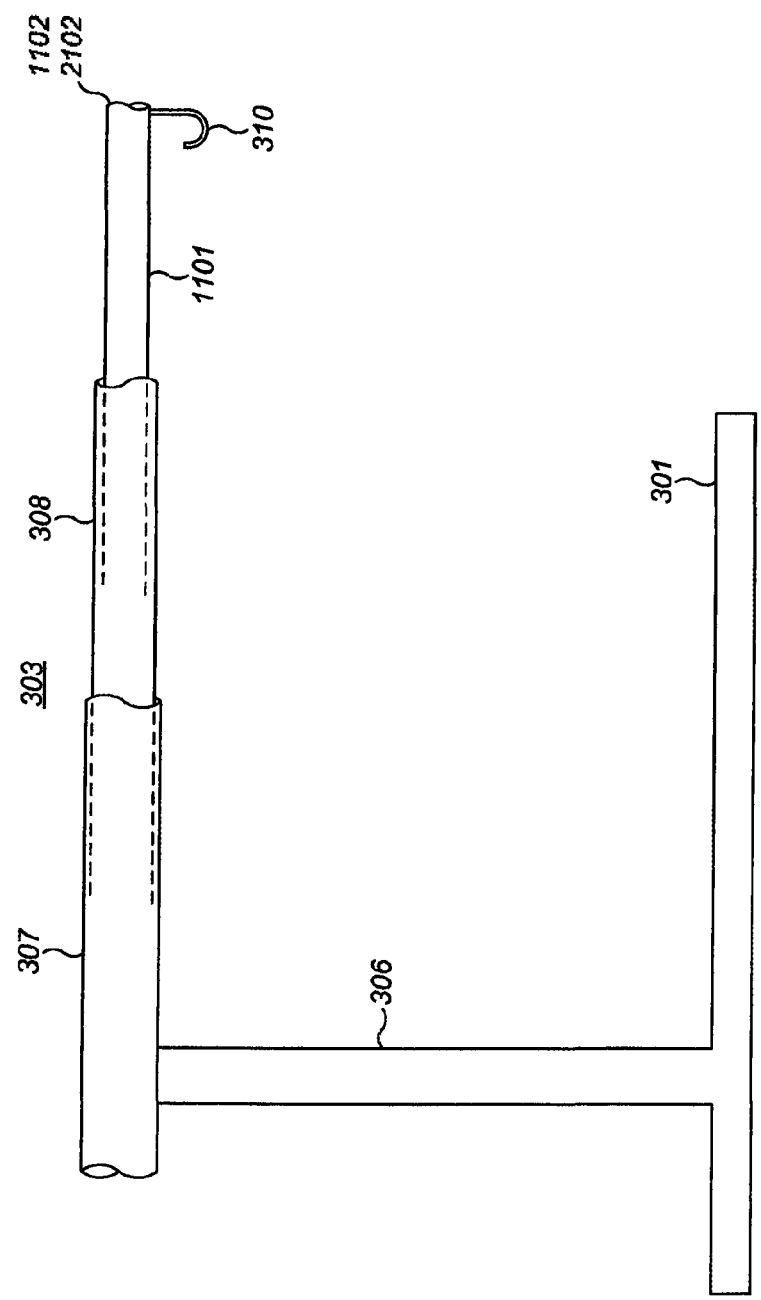
FIG. 9 is a side view of yet another embodiment of the invention.

FIG. 9 is a side view of yet another embodiment of the invention, in which the telescopic arm 303 comprises three sections, fixed section 307, a first extension section 308 and a second extension section 1101. In FIG. 9, the telescopic arm 303 is illustrated in its extended position 1102. The advantage of a third section for the telescopic arm is that it allows a longer extension of the arm and hence enables loading and unloading from the front of the vehicle rather than the side. This removes the need for the arm to swing around reducing the complexity of the hydraulic mechanism and potentially reducing the degree to which counterbalancing support is needed during loading and unloading. The trolley 300 may therefore also be used in a narrow operating environment when there is no need to rotate the articulated arm. The same effect may also be achieved using two longer sections in the telescopic arm, allowing loading and unloading from the front of the vehicle rather than the side. The person skilled in the art will appreciate that more than three sections may be used for the telescopic arm. The skilled person would also recognize that 3 or more sections may be used in a curved telescopic arm. The invention is not limited to a specific number of sections of the telescopic arm nor any combination of number of sections and shape.

In use, the trolley 300 can be transported to a building site on the same truck as the bulk building materials which it is designed to transport. The trolley is sufficiently lightweight that minimal space is lost for other loads and also means that it may be unloaded by the same crane that is used for unloading the bulk materials. Once the trolley 300 has been unloaded onto the ground, transportation of bulk materials between the delivery lorry and a building site with restricted access may begin. Bulk materials are unloaded from the truck. The trolley 300 is positioned near to the truck with support struts 404 extended outwards to the side of the trolley, or the pivoted sections 801 are moved forwardly of the truck to their stabilizer position 802, as required. The trolley crane may then be either rotated to a side position, or extended forwardly, and the hook engaged with the load. Once the load is picked up by the crane 303 it may be lowered onto a platform 301 by appropriate movement of the crane and telescopic arm. The crane may then be lowered onto the load to exert a restraining force on the load to retain the load on the trolley. The support struts 404 may then be withdrawn from their extended position, or pivoted sections 801 moved to their restraining position 901 to further secure the load. Once the load is secure the trolley may be moved. With the load securely fixed on the platform 301, the trolley is then capable of moving the secured load around a sloped or uneven surface without loss of performance. Any desired transportation of the load 302 may then take place, typically via narrow pathways to the rear of a building or some other place with similar restricted access. Once the trolley has arrived at the desired location, the trolley is reconfigured so that unloading can take place.

Figure 10:
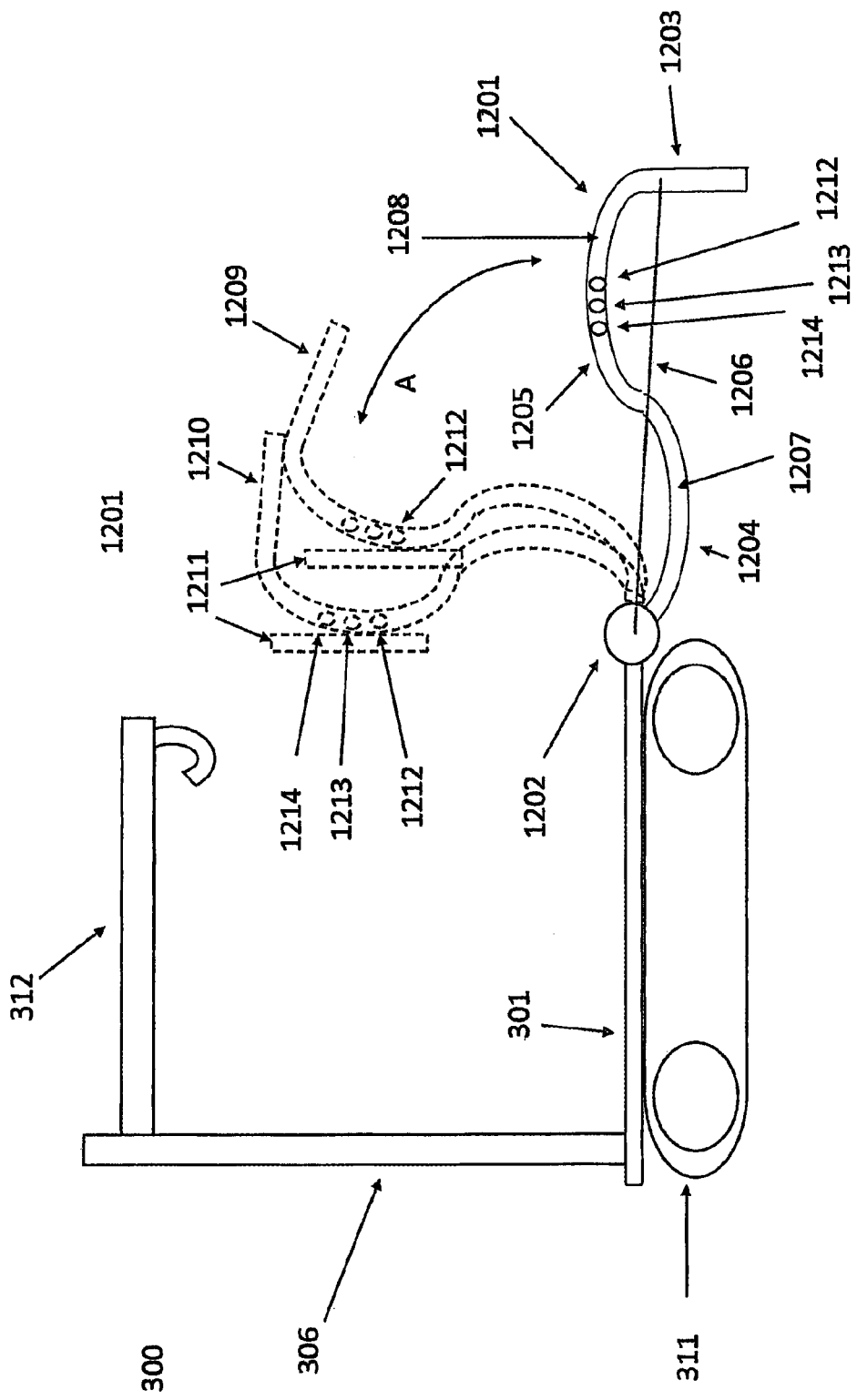
FIG. 10 is a side view of an embodiment of the invention with a double curved stabilizing arm.

Although the curved stabilizers of FIGS. 5 to 8 provide good stability and a useful means of securing the load, more flexibility may be advantageous when dealing with loads of varying size and shape. The stability of the load and its retention in position is of critical importance for a device according to the present invention. Hence an alternative stabilizer shape is provided by yet another embodiment, a side view of which is shown in FIG. 10. FIG. 10 shows the stabilizer 1201 in a pivotal engagement with the flatbed platform 301 of the trolley 300 at a pivot point 1202 at the end proximal the trolley, the stabilizer 1201 extending to an end point 1203 distal to the trolley 300. The stabilizer comprising a first section 1204 and a second section 1205 which curve in opposite directions with respect to an axis 1206 between the pivot point 1202 and the end point 1203. Curvature 1207 of first curved section 1204 depends downwards towards the ground with the trolley in normal use, e.g. in a "u" shape. Curvature 1208 of second section 1203 depends upwards, e.g. in an "n" shape.

The different curvatures of the first and second curved sections allow the stabilization of different sizes and shapes of load. The dashed lines in FIG. 10 shows the stabilizer in two different substantially upright stabilizing positions 1209, 1210 wherein they are configured to assist in the stabilization of the load. Arrow A shows the movement of the stabilizer between its ground engaging position and its load stabilizing positions.

In an embodiment of the invention, a lock-plate 1211, releasably attachable to the stabilizer 1201, provides improved contact with the load 302. A plurality of connection points, 1212, 1213, 1214 are provided for attaching the lock-plate to the stabilizer 1201. The different connection points correspond to different load restraining positions for the stabilizer. For example, in stabilizing position 1209, connection point 1212 is used, whereas in position 1210, connection point 1213 is used. Only 3 connection points are shown for clarity, but the person skilled in the art will appreciate that more or fewer connection points may be provided and the invention is not limited to any particular number of connection points.

The lock-plate may also comprise a pivot-foot 1901 allowing it to pivot about its connection point and therefore adjust to fit the load better, no matter at what angle the stabilizer meets the load when in its securing position.

In a further embodiment, and as seen in FIGS. 19(*a*)-19(*c*), not only is the lock-plate tiltably adjustable about its connection to the stabilizer arm, but the distance away from the arm may also be adjusted. The lock-plate is attached to the stabilizer arm by way of a stem 1902 extending away from the base of the lock-plate and passes through the stabilizer arm at any of the multiple connection points. The lock-plate stem comprises a multitude of connection points/apertures along its length. Therefore, not only may the lock-plate be attached the stabilizer at a multitude of points along the stabilizer arm as described above, but the distance (or "reach") of the lock-plate from the stabilizer arm may also be adjusted by securing a bolt/pin through the corresponding connection point along the length of the connection arm. Thus, particularly small loads may still be secured by the stabilizer arms by increasing the distance of the lock-plate from the stabilizer arm, i.e. its reach, so that the lock-plate engages with the load sooner as the stabilizer arms are retracted into their retaining position.

Figure 11:
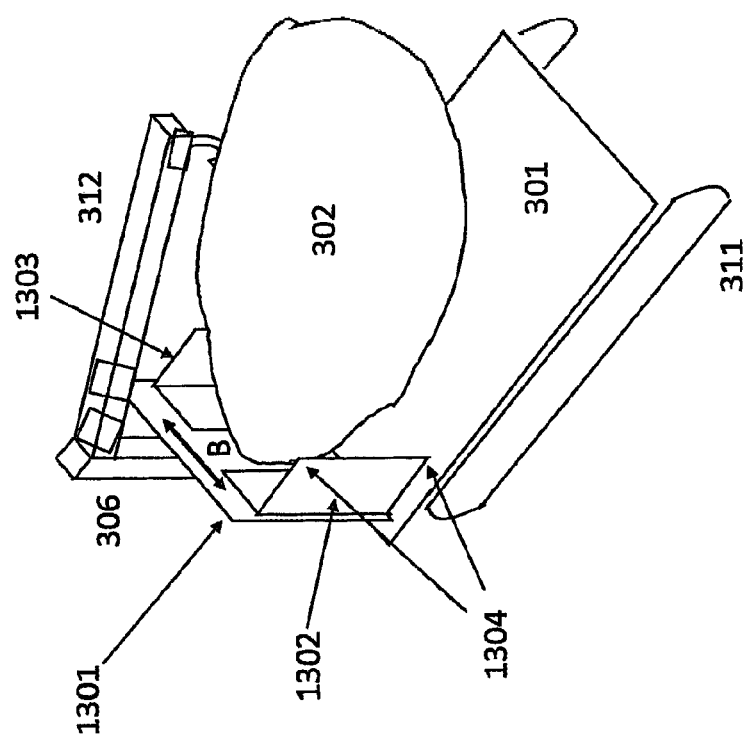
FIG. 11 is a perspective view of an embodiment of the invention with head stock and side panels.

A further improvement in the stability of the load may be achieved by the inclusion of a "head stock" 1301, which secures the load 302 toward the mast end of the platform. A headstock is a plate, grille or other suitable barrier, such as a set of bars, which is located at the mast-end of the trolley and provides a restraint for the load. FIG. 11 is a perspective view of an embodiment of the invention incorporating a headstock 1301. In an embodiment, the head stock is located substantially level with a forward end of the mast of the articulated crane 306. In a preferred embodiment, the head stock is located in a plane substantially perpendicular to the platform 301 and substantially perpendicular to the normal direction of motion of trolley 300.

Further, lateral, stabilization is provided by means of load retaining side panels or "wings" 1302, 1303. These can be seen in more detail in the side-on and front-on views of FIG. 18. In an embodiment these side panels comprise two plates located on each side of the trolley. They are movable in a direction transverse to the platform 301, so as to provide lateral stabilization to loads of different size and shape. This movement is shown by arrow B.

In one embodiment, the side-panels 1302, 1303 are secured to the trolley platform by pins engaging with discrete positional holes in the floor of the platform. The side-panels can be moved to multiple positions on the flatbed platform 301 corresponding to where the securing holes are.

In a further embodiment, the corners 1304 of the side panels 1302, 1303 are rounded to prevent damage to loads comprising bags. In a further embodiment, the side panels are provided with a padded or rubber facing to prevent damage to items such as bricks.

Figure 18B:
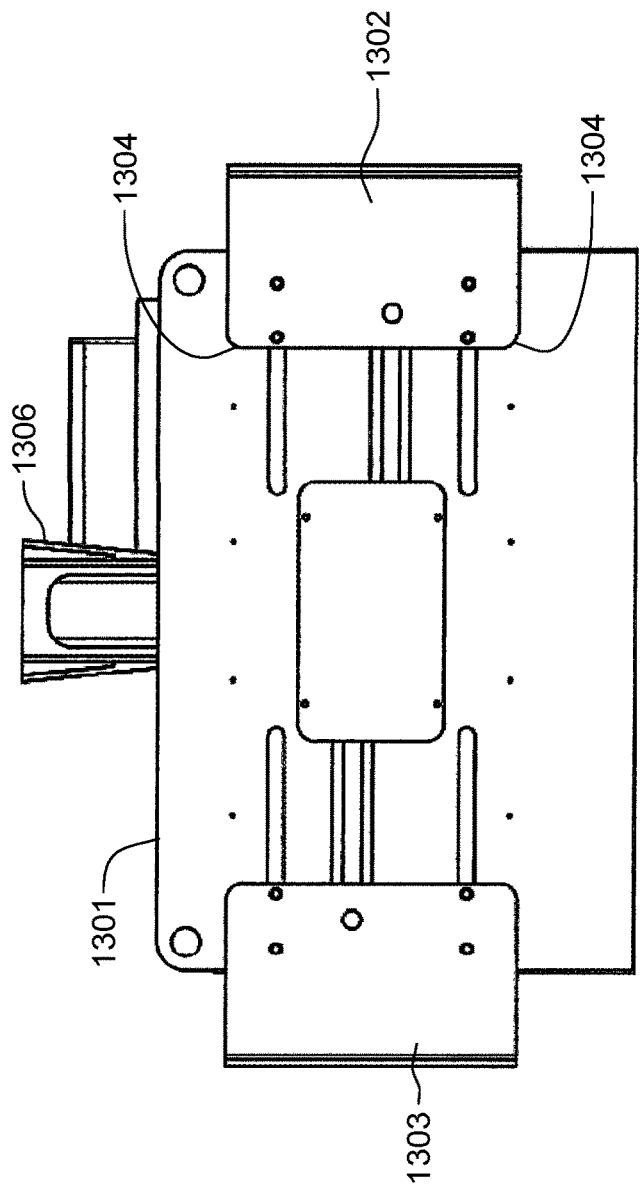

In a preferred embodiment, and as seen in FIGS. 18(a) & 18(b), the side panels 1302, 1303 are controlled, and may be moved laterally, adjusting the width between them, hydraulically. Two hydraulic rams are typically provided behind the headstock 1301. The person skilled in the art will appreciate that the location of the rams may be changed and that the invention is not limited to any one location of the hydraulic rams. In yet another embodiment of the invention, control of the side panels is accomplished by means of a single ram located in the base of the mast.

In a further embodiment, the side-panels are operable to re-locate any load placed upon the trolley platform. The side-panels are therefore used to "square" or "centre" any load that may have been lowered onto the trolley out of its desired position. Thus, once the crane has been used to lower the load onto the trolley platform, the side-panels are used to shift, and relocate the load about the platform to a desired position. In a similar fashion, the pivotable arms may also be used to push/squeeze/manoeuver the load into its correct location on the platform in order to make sure it is correctly placed for maximum security for transport.

When used in conjunction with a rotating module attached to the crane, a square/rectangular load (as is common) can be easily located correctly on the trolley by "trapping"/locating one corner of the load against one of the side panels, and rotating the load into place. Using this method means the operator need only guide the load into one corner, and the rotator will proceed to align the rest of the load correctly.

In a further embodiment, the side panels can be adapted to engage much smaller loads. The hydraulic system used to adjust the distance between the two opposing panels (either together, or independently) will be limited in its range, both inward and outward. When a load is too narrow to be effectively secured by the side panels, even at their narrowest, additional narrowing-pads (not shown) may be employed.

As seen in the side-on view in FIG. 18(a), the side panels comprise two apertures 1800 in their outer faces. It is envisioned that the narrowing blocks will be removably attached to the inside of the side panels by a system of magnets incorporated into the narrowing-blocks. The magnets do not need to provide a very strong force, only enough to hold the narrowing-blocks in place until they engage with the narrow load, since they will be held in place under compression. Spigots in the outer surface of the narrowing-blocks will engage with the corresponding apertures in the side panels, both correctly-locating, and supporting the narrowing-blocks. The blocks are envisioned to be the same shape and size as the outer face side-panels, but providing much more depth. Therefore, once the narrowing-blocks have been attached to the inside of the side panels, they are able to engage and secure loads previously too narrow to do so.

Furthermore, some loads (such as lumber or timber) are neither uniformly smooth nor shaped on their outer surface. Therefore, standard means of securing them may not prove effective. For this reason, the narrowing-blocks may be further adapted to incorporate a rough, sharp or toothed inner surface such that they provide a greater gripping/grabbing force to the uneven load. The side panels with their narrowing blocks may then be closed, and the uneven load will be secured between the opposing gripping faces.

Figure 12:
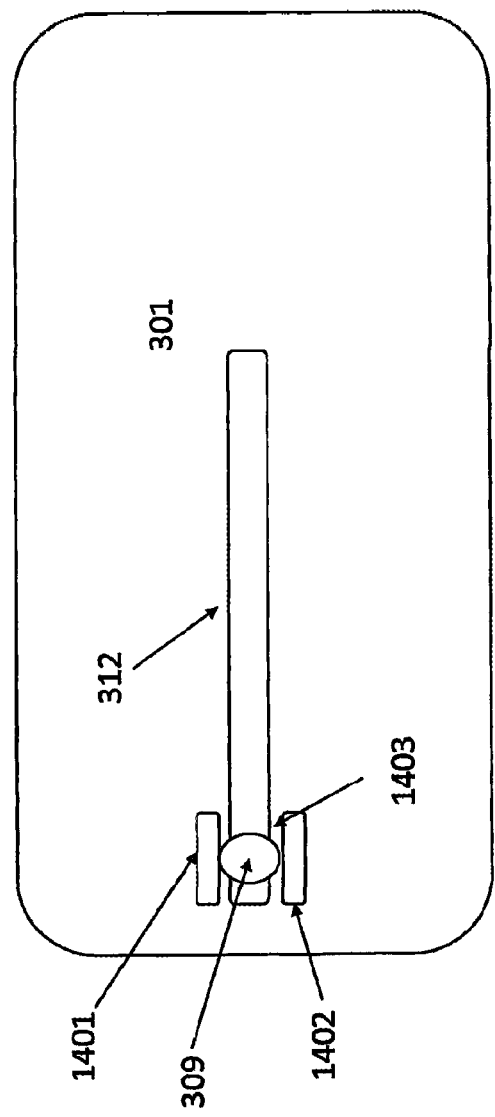
FIG. 12 is a top view of a trolley with a mast comprising side plates according to an embodiment of the invention.

In a self-propelled trolley which is to be used in potentially confined areas, space used on the trolley compared with the overall size of the trolley is of critical importance. Any space on the trolley which is not available for the use of "load" may therefore be considered to be wasted and should be kept to a minimum. In order to reduce such wasted space, a new mast arrangement may be provided in an embodiment of the invention, wherein the mast is comprised of two outer plates with the supporting boom located between the plates. FIG. 12 is a top view of a mast according to this embodiment, showing the first side plate 1401 and the second side plate 1402. Side plates 1401, 1402 provide support for the telescopic crane 303 and provide a cavity 1403 to contain the support ram 309, when in a retracted position. The support ram 309 would otherwise be located on the trolley bed 301 in front of the mast, thus taking up valuable loading space. The "hollow" mast embodiment described above allows for the support ram 309 to be located within the base of the two side plates 1401, 1402 this freeing up space upon the platform 301.

The skilled person will appreciate that alternative arrangements for the plates and support section are possible. For example, a conventional crane mast may be used below the ram, which is then divided into two plates to accommodate the hydraulic support ram. The invention is not limited to any one arrangement of side plates and support ram.

Figure 13:
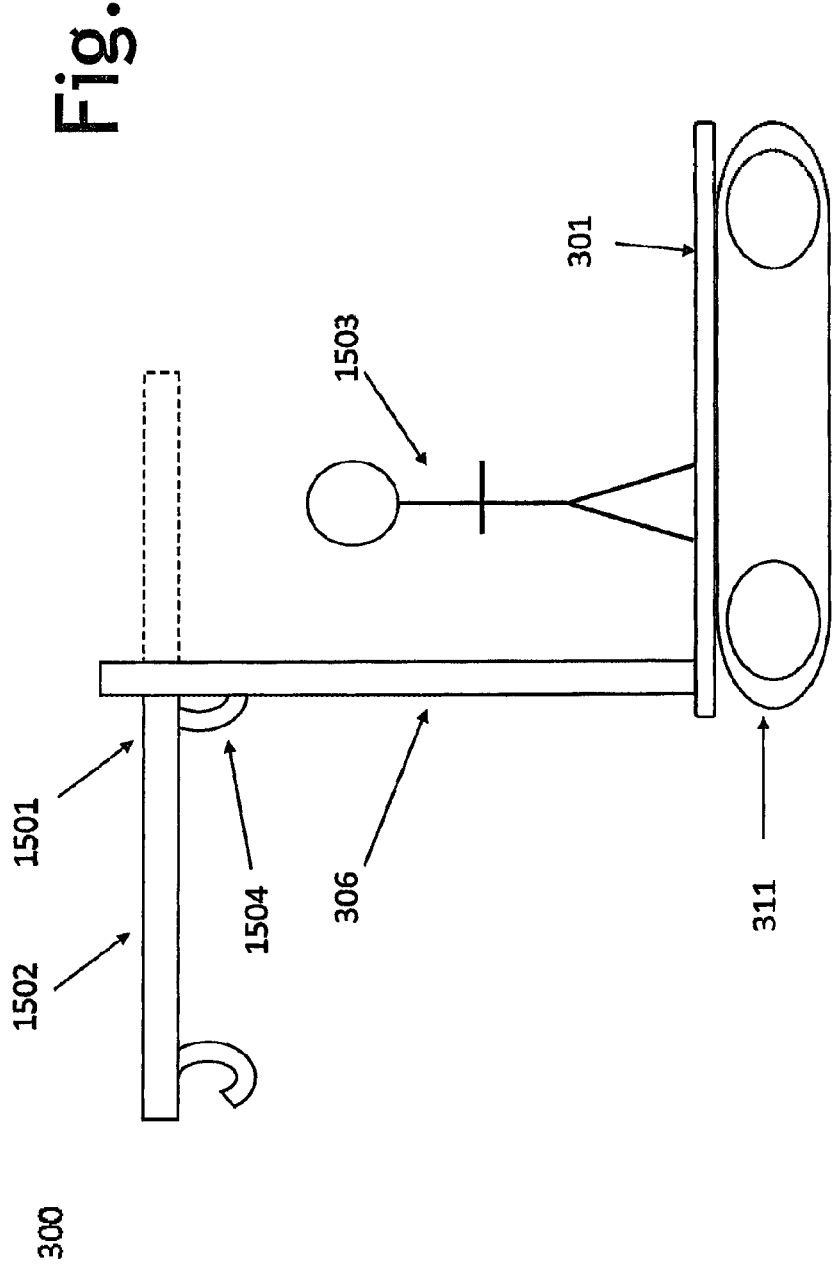
FIG. 13 is a side view of an embodiment of the invention with the reversible boom feature.

In yet another embodiment of the invention, a reversible boom 1501 is provided which enables the crane to perform the dual functions of loading the trolley in a first mode, in which the crane is used for loading and unloading building materials from the trolley, and also allows, in a second mode, an operator to stand upon the trolley and use the boom for accurate lifting and/or positioning of items such as kerbstones, fence posts etc. This is particularly useful when operating in a confined space, where a 180° swing of the boom may not be feasible. FIG. 13 is a side view of an embodiment of the invention with the reversible boom feature, with reversible boom 1501 positioned in the second mode, to allow use for positioning building material. FIG. 13 shows reversible boom 1501 in reversed position 1502 on the opposite side of the mast 306, where it may be used for accurate positioning of building materials. The operator 1503 may now stand on the platform 301 whilst operating the crane in second mode. Instead of swiveling around on its axis to reverse the position of the telescopic crane, the embodiment with the reversible boom 1501 allows the crane section to pass through the mast, thus allowing the reversal of the boom relative to the trolley 300 when the trolley is in a confined space. A second hook 1504 is provided to enable use of the crane in its reversed position 1502.

Figure 14:
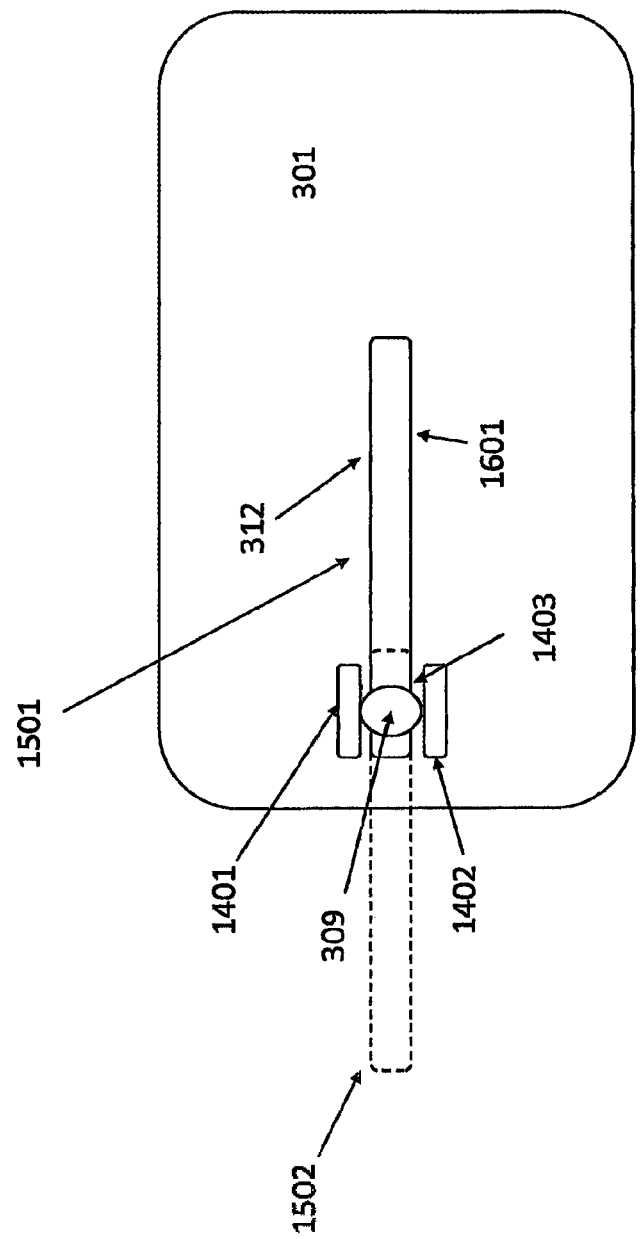
FIG. 14 is a top view of the embodiment of FIG. 13.

FIG. 14 shows in particular a further embodiment of the invention, including the two plate mast structure used here to implement the reversible boom by allowing the boom to be slidably moved through the cavity between the plates from a first operating position over the platform to a second operating on the opposite side. FIG. 14 shows the boom 1501 in a first operating position 1601, corresponding to operation in the first mode and movable through the cavity 1403 between the support plates 1401, 1402 into the second operating position 1502 corresponding to the second mode.

Figure 15:
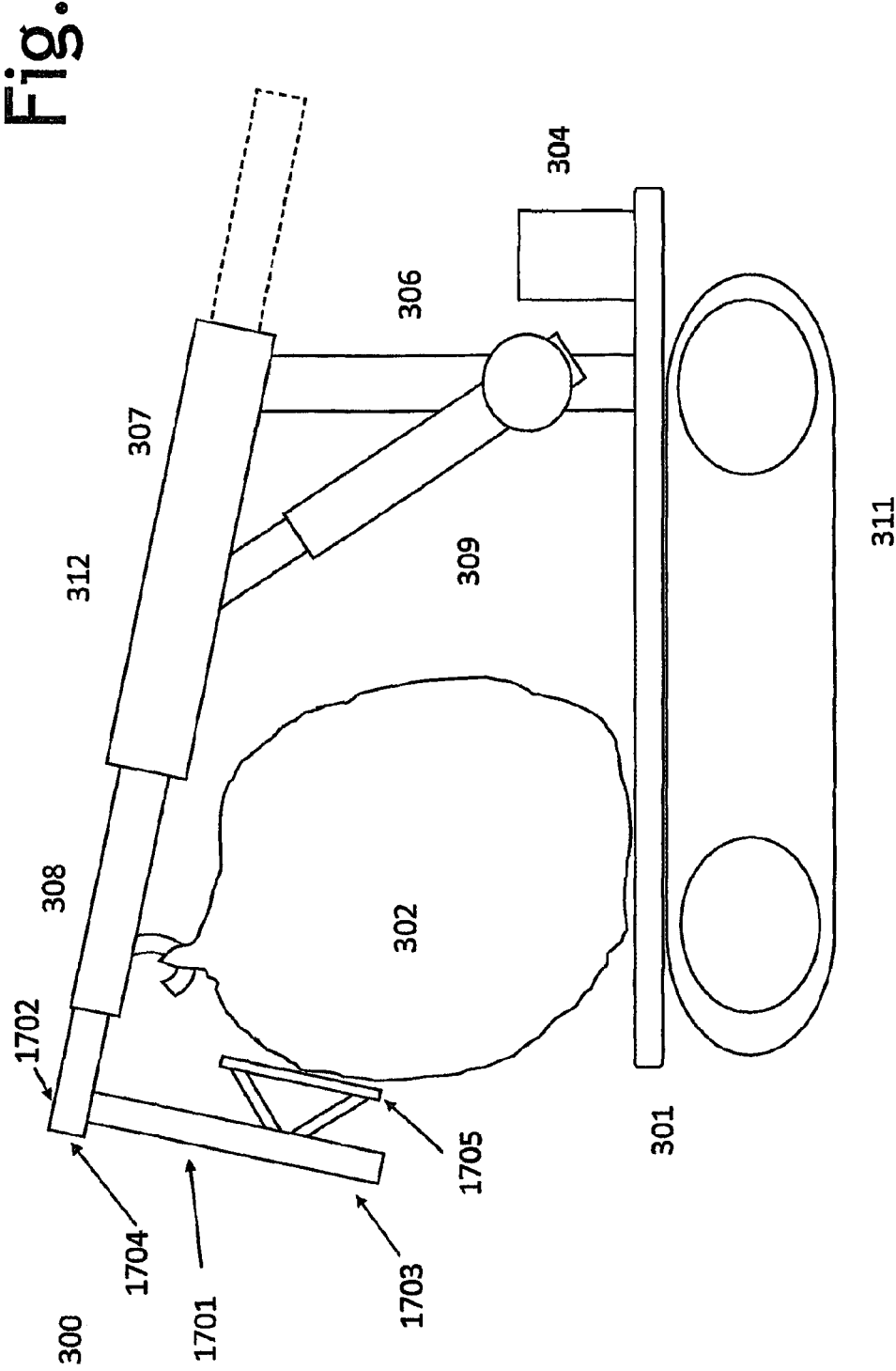
FIG. 15 is a side view of an embodiment of the invention incorporating a load retainer.

Further stability for the load may be achieved by a further modification of the telescopic crane, in the form of the addition of a "load retainer". FIG. 15 is a side view of an embodiment of the invention comprising this feature. The retainer 1701 comprises a first section 1702 substantially parallel with the telescopic crane arm 303 and a second section 1703 which depends from an end 1704 of the first section 1702, and further comprises a retaining plate 1705. In an embodiment the first section 1702 of the retainer 1701 is telescopically retractable within telescopic crane 303. In use, the retainer may be retracted or extended to match the size of any load 302. The retaining plate 1705 is brought into contact with the load 302 in order to further stabilize the latter. In an embodiment, the retaining plate 1705 uses a "pivot foot" design, to adjust automatically to match the angle of the load.

In a preferred embodiment, the trolley 300 is controlled and operated from a control means located towards the rear of the trolley, behind the mast of the telescopic crane. It is foreseen that the operator will operate the device from the ground behind the trolley. However, the skilled person will appreciate that the trolley may also be operated whilst the operator is stood or sat upon the trolley device (such as when operating the crane in the embodiment comprising the reversible configuration) or remotely, whether wired or wirelessly apart from the trolley device.

Further improvements include a new pallet lifting system, and a new bulk bag lifting system.

Figure 16:
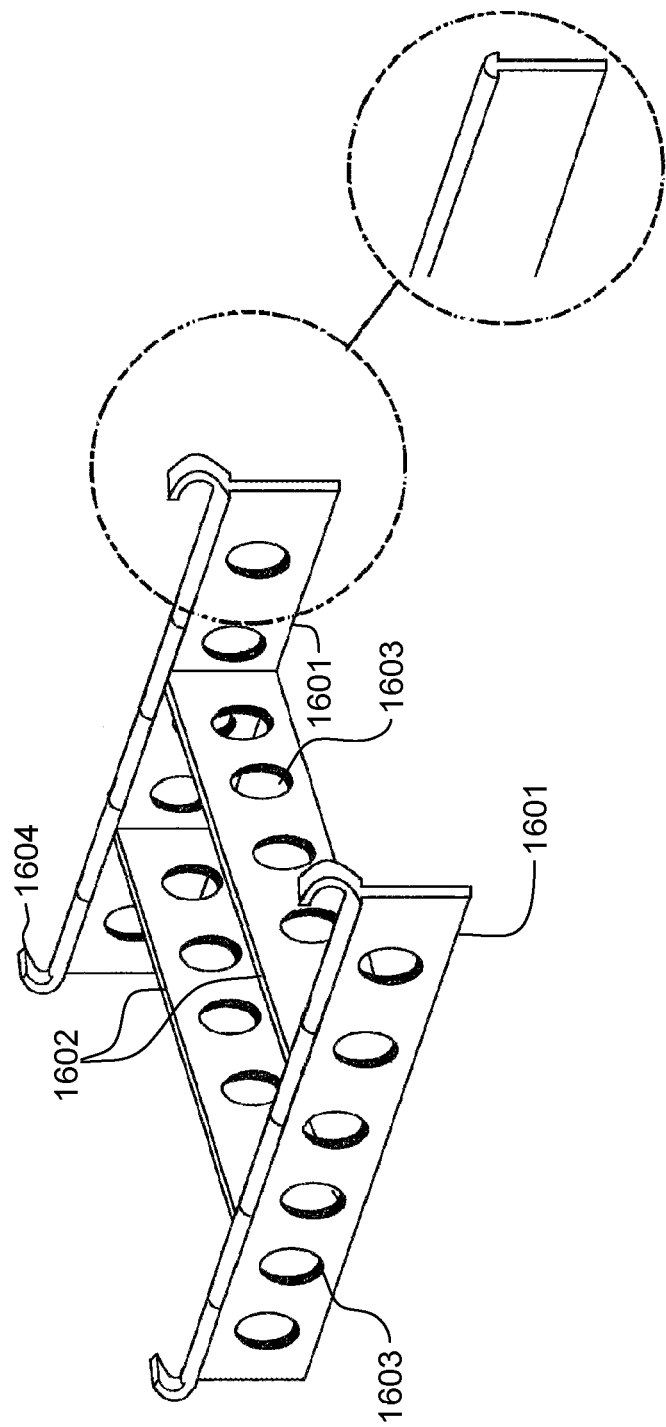
FIG. 16 is a perspective view of a new lifting frame feature which may be incorporated into the present invention.

As seen in FIG. 16, the new lifting system comprises a framework of two pairs of parallel beams 1601, 1602, perpendicular to each other. One pair of beams 1601 extends beyond the other pair 1602, thus forming a double-width I-beam, comprising an inner and an outer pair of beams. The beams are preferably steel, and are orientated along their long edges in a grid-like configuration. The beam faces each comprise a number of apertures 1603 along their length through which straps may be passed in order to hang a load beneath the frame. At each of the four ends of the outer parallel beams, there is a hook 1604 for supporting a load with its own incorporated loops. Any straps may be looped directly through an aperture, or passed over the beam and attached to any one of the apertures of the other pair beyond in order to accommodate different load widths. The frame has a rounded/smoothed top edge, so that any straps passed over it may do so without chaffing. In use, the new lifting system is suspended beneath the distal end of the telescopic crane (which may incorporate a rotator module) and the lifting straps for the load are attached to the steel grid at the appropriate points corresponding to the size of the load. Therefore wider loads can be lifted and supported by vertical harnesses, spread apart from each other, which will not crush their suspended cargo, as maybe the case if they were all secured to a single lifting point.

Figure 17:
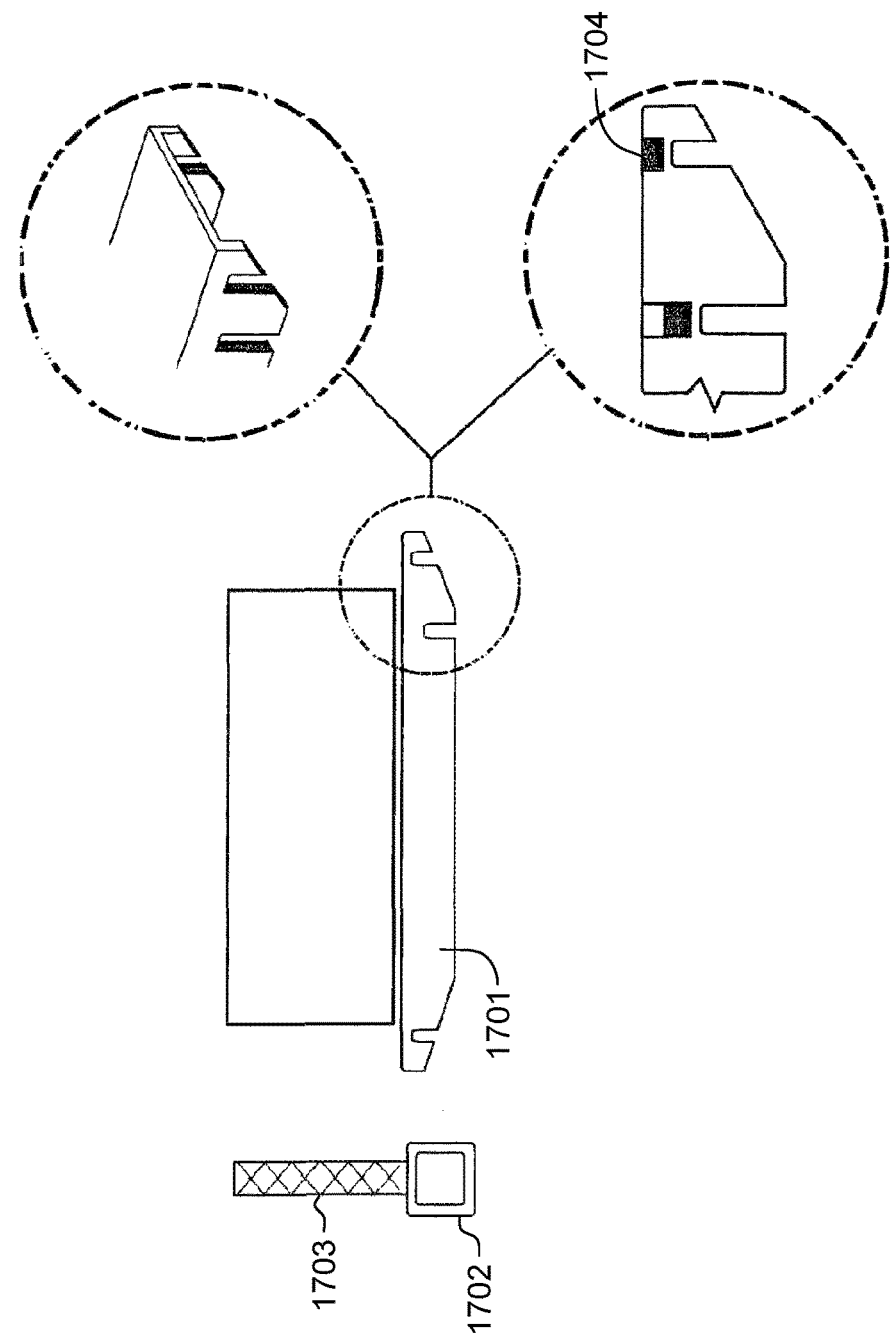
FIG. 17 is a side-on view of a new lifting channel system to engage with a pallet and provide a quick, easy and safe way of preparing a load for use by the invention.

As seen in FIG. 17, the new channel system comprises inverted u-beams 1701 (i.e. n-beams) to be fed through the fork-lift channels in a pallet. Each beam has tapered ends to allow them to be easily inserted into the pallet channels. The corners are also rounded to assist with feeding through the pallet channels.

Once fed through the pallet channels, each end of each beam is attached to one end of a lift strap via a "D-ring" attachment 1702 (shown front-on). Each of the upright edges of the lift beams comprises a number of vertical cut-out slots to accommodate the lower lip of each D-ring. The size of the load will dictate which slot is used. The "D-ring" (itself a continuous squared-loop of metal, preferably steel, secured to a lifting strap 1703) is placed over the lift beam, and lifted so that the lower edge is then slotted into one of the available vertical slots. Magnets 1704 incorporated into the underside of each channel above each slot ensure that the D-ring remains in the slot, even when the straps are slack. Therefore there is no danger of the D-ring inadvertently disengaging from the lifting beam. Once the D-ring has been attached the load may be lifted and relocated.

In a further embodiment of the invention, it is possible to load and unload the trolley itself from the back of a flat-bed lorry, or other suitable vehicle, using only a singular attachment point. Instead of having to attach multiple harnesses to the trolley, a crane may be used to lift/lower the device via a single attachment point located on the boom of the articulated crane. Therefore, not only is the crane structure able to withstand and operate whilst under a downward force of a load, but is also able to support the weight of the (unladen) trolley as it is lifted by a crane.

Figure 20A:
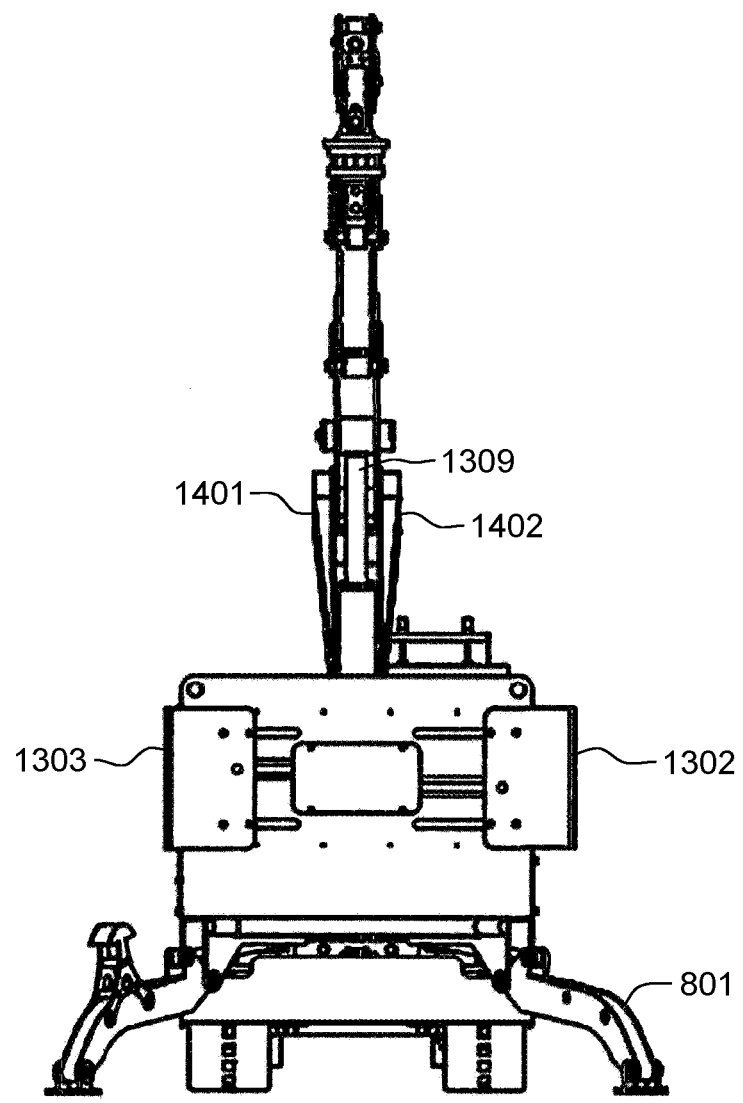
Figure 20B:
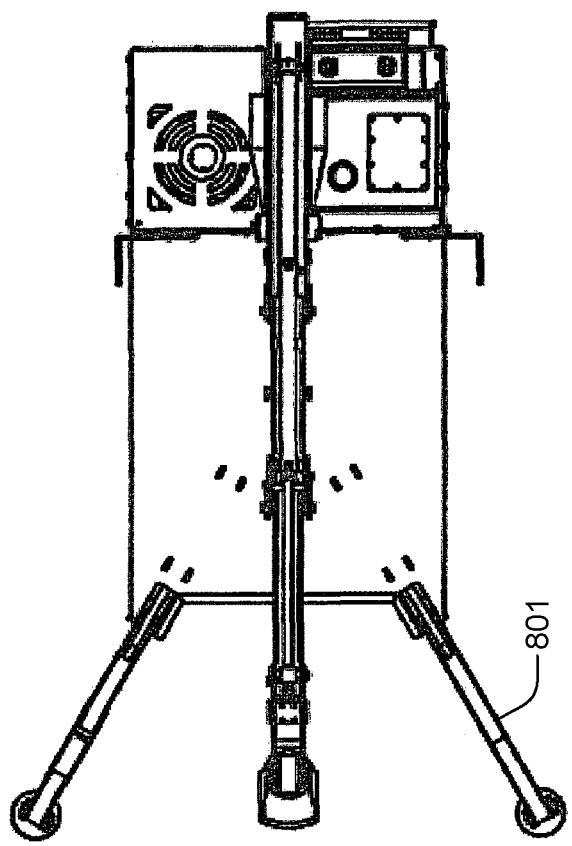
Figure 20C:
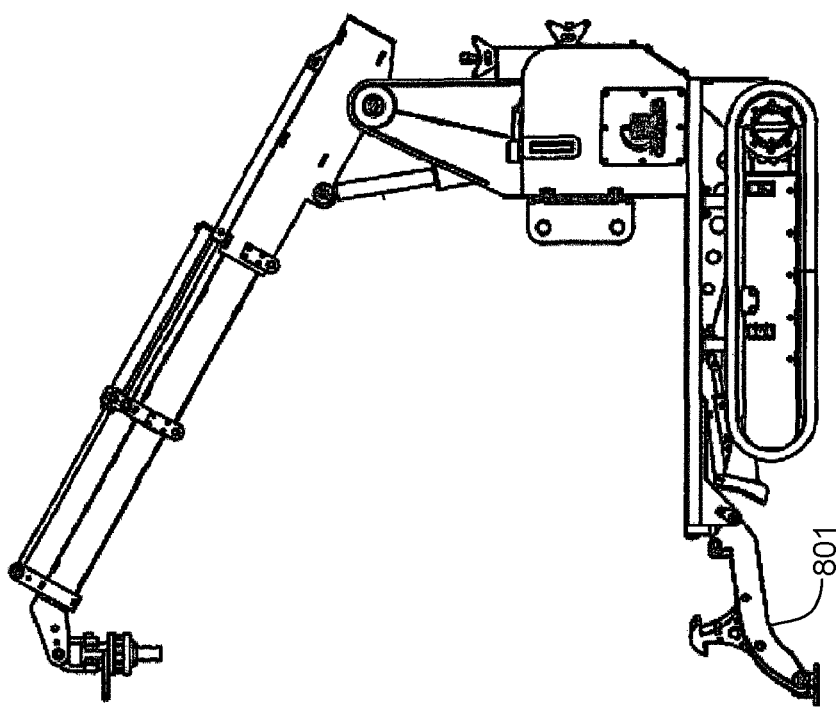

FIGS. 20(a)-20(c) show three views of a preferred embodiment of the invention, incorporating the pivotable stabilizing arms, angled at approximately 45° to the forward direction of the device, the support ram of the telescopic crane housed between the two opposing support structures forming the mast, hydraulically controlled side-panels, and fully adjustable lock-plates attached to the pivotable stabilizing arms.

The invention is not limited to the details of the above embodiments. For example, the pivoted sections 801 may be positioned on any suitable part of the trolley 300.

Figure 19A:
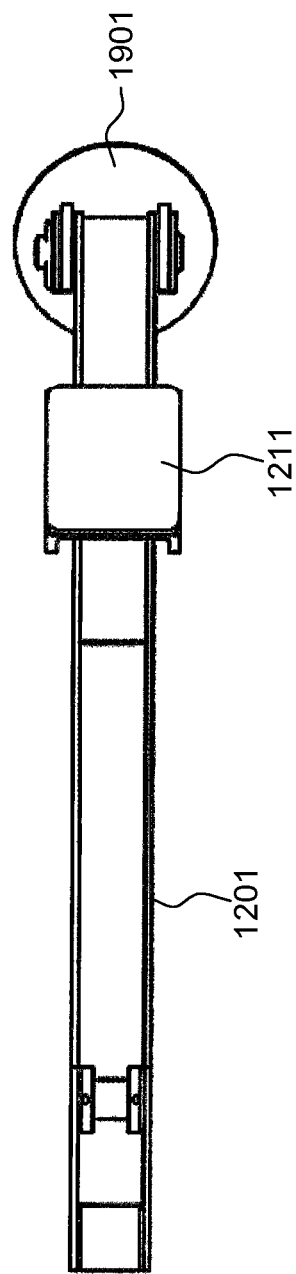
Figure 19B:
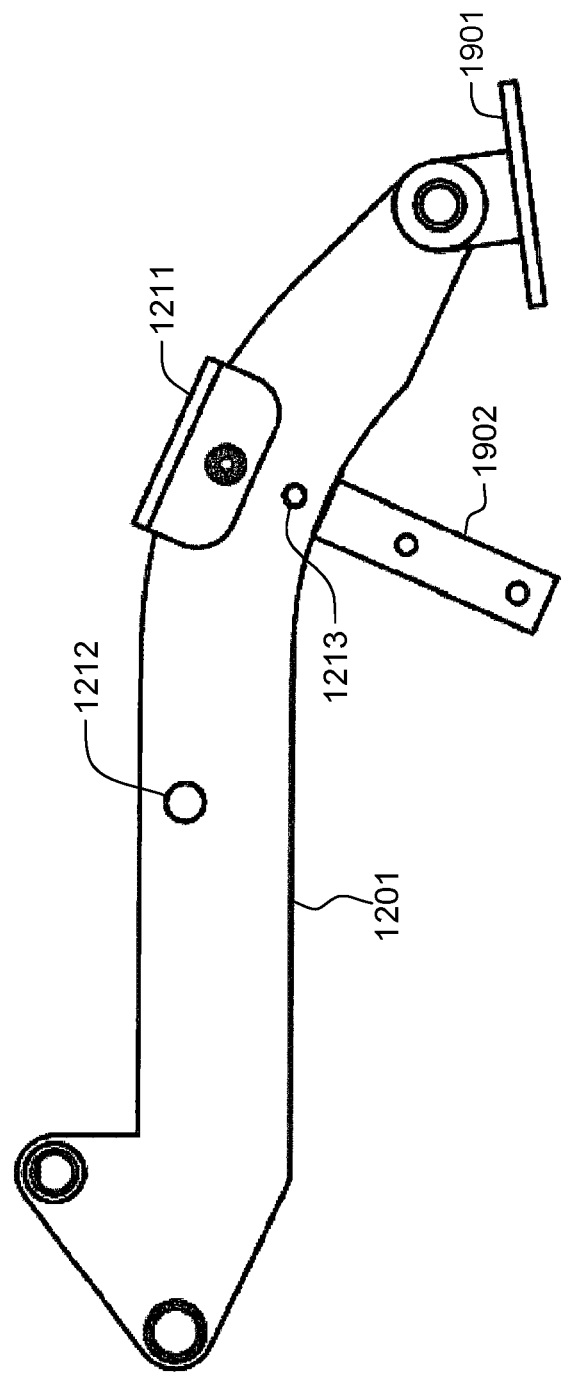
Figure 19C:
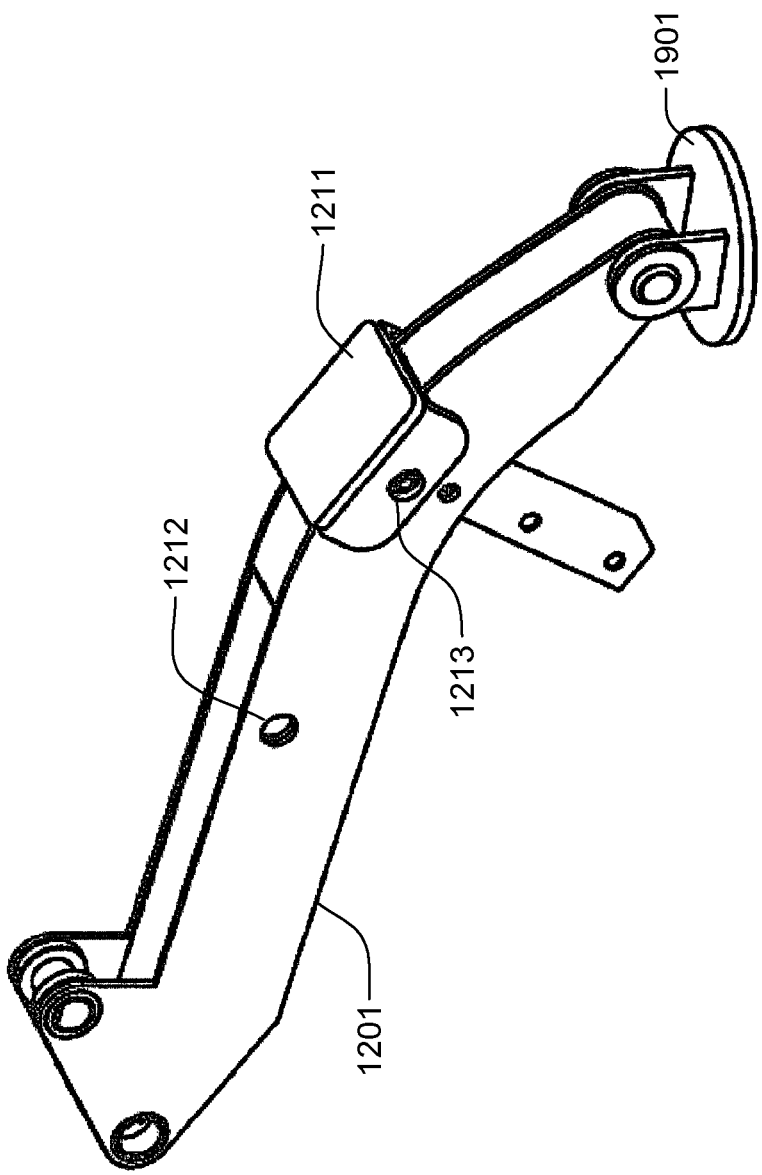

Another example is that the pivoted sections may have just one curve instead of the double curve in the example embodiments, as seen in FIGS. 19(a)-19(c).

The invention claimed is:
1. A self-propelled flat-bed trolley, comprising:
motorized locomotion means,
a load-bearing platform, an articulated crane having a telescopic arm adapted to load and unload articles to and from the load-bearing platform, a controller for controlling the motorized locomotion means and articulated crane, and wherein:

the trolley further comprises at least one further arm hingeably attached to the trolley and moveable between a first and a second position, wherein:

in the first position the at least one further arm acts as a stabilizing outrigger for the trolley, in the second position the at least one further arm secures any articles loaded atop the load-bearing platform; and a lock-plate removably attached to the at least one further arm, and adapted to engage with and restrain any articles atop the load-bearing platform when the at least one further arm is in the second position.

2. The self-propelled flat-bed trolley according to claim 1, wherein:

the articulated crane is maneuverable to locate a centre-of-mass of the articles within a base of support for the trolley.

3. The self-propelled flat-bed trolley according to claim 1, wherein the at least one further arm is curved.

4. The self-propelled flat-bed trolley according to claim 3, wherein the at least one further arm comprises two sections, the two sections including:

a first section, proximal to a hinge, which curves substantially upwards in a "u" shape, and a second section, distal from the hinge, which curves substantially downwards in an "n" shape.

5. The self-propelled flat-bed trolley according to claim 1, further comprising a plurality of receiving points on the at least one further arm, the plurality of receiving points providing multiple attachment points for the lock-plate.

6. The self-propelled flat-bed trolley according to claim 1, wherein the lock-plate is tiltably engaged with the at least one further arm.

7. The self-propelled flat-bed trolley according to claim 1, wherein the lock-plate comprises:

a head section for engaging with a load, and a stem section extending away from the head section for attaching the lock-plate to the at least one further arm of the trolley, wherein:

the stem section comprises a plurality of attachment points along its length so that the distance of the head section from the at least one further arm of the trolley may be adjusted according to size of a load to be secured.

8. The self-propelled flat-bed trolley according to claim 1, wherein the trolley further comprises a barrier surface substantially perpendicular to the load-bearing platform, the barrier surface providing a restraint in at least one direction for any articles loaded atop the load-bearing platform.

9. The self-propelled flat-bed trolley according to claim 8, further comprising opposing side-panels on either side of, and substantially perpendicular to, the barrier surface.

10. The self-propelled flat-bed trolley according to claim 9, wherein distance between the opposing side-panels is hydraulically controlled.

11. The self-propelled flat-bed trolley according to claim 9, wherein the side-panels are operable to re-locate a load on the trolley to a desired position.

12. The self-propelled flat-bed trolley according to claim 9, wherein each side-panel of the opposing side-panels includes at least one rounded corner.

13. The self-propelled flat-bed trolley according to claim 9, wherein the side-panels are padded to avoid damaging a load secured by them.

14. The self-propelled flat-bed trolley according to claim 1, wherein said articulated crane comprises:

a mast supporting the telescopic arm, and a hydraulic support ram engaging the telescopic arm and the mast.

15. The self-propelled flat-bed trolley according to claim 14, wherein the mast comprises a first support member and a second support member defining a cavity for receiving the hydraulic support ram.

16. The self-propelled flat-bed trolley according to claim 14, wherein the telescopic arm further comprises:

a first arm section engaged with the mast, and a telescopic second arm section, hydraulically moveable with respect to the first arm section between a first position and a second position.

17. The self-propelled flat-bed trolley according to claim 16, wherein the telescopic second section is slidably movable through the mast between the first and second positions.

* * * * *